(12) United States Patent
Borgi

(10) Patent No.: US 8,282,116 B2
(45) Date of Patent: Oct. 9, 2012

(54) REAR SUSPENSION FOR A MOTOR VEHICLE

(75) Inventor: Guido Borgi, Piossasco (IT)

(73) Assignee: Sistemi Sospensioni S.p.A., Milan (IT)

( * ) Notice: Subject to any disclaimer, the term of this patent is extended or adjusted under 35 U.S.C. 154(b) by 203 days.

(21) Appl. No.: 12/682,743

(22) PCT Filed: Oct. 15, 2008

(86) PCT No.: PCT/IB2008/054230
§ 371 (c)(1),
(2), (4) Date: Apr. 12, 2010

(87) PCT Pub. No.: WO2009/050652
PCT Pub. Date: Apr. 23, 2009

(65) Prior Publication Data
US 2010/0219677 A1    Sep. 2, 2010

(30) Foreign Application Priority Data

Oct. 18, 2007  (IT) .............................. TO2007A0735

(51) Int. Cl.
*B60G 7/00* (2006.01)
*B60G 3/14* (2006.01)

(52) U.S. Cl. ........... 280/124.128; 280/124.116; 301/132

(58) Field of Classification Search ........... 280/124.128, 280/124.116, 124.129, 124.132; 301/132; B60G 21/05, 3/02, 3/12, 3/14, 3/18, 3/20, B60G 3/22, 3/24, 7/00
See application file for complete search history.

(56) References Cited

U.S. PATENT DOCUMENTS

| 3,332,701 | A | * | 7/1967 | Masser | 280/124.116 |
| 3,482,854 | A | * | 12/1969 | Masser | 280/86.75 |
| 3,801,086 | A | * | 4/1974 | Raidel | 267/67 |
| 3,921,999 | A | * | 11/1975 | Masser | 280/676 |
| 4,181,323 | A | * | 1/1980 | Raidel | 280/86.75 |
| 4,184,698 | A | * | 1/1980 | Raidel | 280/686 |
| RE30,308 | E | * | 6/1980 | Masser | 280/86.75 |

(Continued)

FOREIGN PATENT DOCUMENTS

FR    2 698 825 A1    6/1994

(Continued)

*Primary Examiner* — Ruth Ilan
*Assistant Examiner* — Keith Frisby
(74) *Attorney, Agent, or Firm* — Sughrue Mion, PLLC

(57) ABSTRACT

The suspension comprises, for each rear wheel, a trailing arm (16), a wheel-carrying structure (18) fixed to a length (24) of the trailing arm (16) and an axle (44) fixed to the wheel-carrying structure (18). The wheel-carrying structure (18) is made as a single piece forming an upper support portion (38) having a seat (42) into which the wheel axle (44) is inserted and fixed, and a lower attachment portion (40) including a pair of vertical flat walls (34) which are parallel to each other, are arranged astride of said arm length (24) and have a plurality of through holes (46) aligned in pairs. The arm length (24) forms a pair of vertical walls (26) to which three spacers, each having a through hole (30), are fixed, and a pair of end flat surfaces (32). The spacers (28) project beyond the vertical walls (26) of the arm length (24) in such a manner that their end flat surfaces (32) form two abutment flat surfaces for the vertical flat walls (34) of the wheel-carrying structure (18). The wheel-carrying structure (18) is fixed to the arm length (24) by means of three fixing screws (48) inserted into the through holes (46, 30) of the vertical flat walls (34) of the wheel-carrying structure (18) and of the spacers (28).

4 Claims, 3 Drawing Sheets

U.S. PATENT DOCUMENTS

| | | | | |
|---|---|---|---|---|
| 4,309,045 A | * | 1/1982 | Raidel | 280/124.116 |
| 4,541,653 A | * | 9/1985 | Raidel | 280/124.109 |
| 4,595,216 A | * | 6/1986 | Ware | 280/86.75 |
| 4,615,539 A | * | 10/1986 | Pierce | 280/124.116 |
| RE32,486 E | * | 9/1987 | Raidel, Jr. | 280/86.75 |
| 4,718,692 A | * | 1/1988 | Raidel | 280/124.116 |
| 4,763,923 A | * | 8/1988 | Raidel | 280/86.5 |
| 4,775,166 A | * | 10/1988 | VanDenberg et al. | 280/677 |
| 5,002,305 A | * | 3/1991 | Raidel | 280/124.116 |
| 5,288,100 A | * | 2/1994 | Cherry et al. | 280/86.75 |
| 5,335,932 A | * | 8/1994 | Pierce | 280/788 |
| 6,086,162 A | * | 7/2000 | Pinch et al. | 301/124.1 |
| 6,131,930 A | * | 10/2000 | Chalin | 280/86.75 |
| 6,158,773 A | * | 12/2000 | Verhaeghe | 280/787 |
| 6,241,266 B1 | * | 6/2001 | Smith et al. | 280/124.116 |
| 6,257,597 B1 | * | 7/2001 | Galazin | 280/6.151 |
| 6,491,314 B2 | * | 12/2002 | Smith et al. | 280/124.116 |
| 6,672,604 B2 | * | 1/2004 | Eveley | 280/124.128 |
| 2001/0030406 A1 | * | 10/2001 | Pierce | 280/124.116 |
| 2006/0091721 A1 | | 5/2006 | Han et al. | |
| 2006/0175775 A1 | * | 8/2006 | Bolt et al. | 280/5.514 |

FOREIGN PATENT DOCUMENTS

| | | |
|---|---|---|
| FR | 2 701 431 A1 | 8/1994 |
| JP | 08099511 A * | 4/1996 |
| JP | 2000-313217 A | 11/2000 |

* cited by examiner

REAR SUSPENSION FOR A MOTOR VEHICLE

FIELD OF THE INVENTION

The present invention relates in general to a rear suspension for a motor vehicle, and more in particular to a wheel-carrying structure intended for fixing the axle of a rear wheel to a trailing arm of the suspension.

SUMMARY OF THE INVENTION

The solution traditionally adopted to fix the axle of a rear wheel to an arm of the suspension of that wheel, for example a trailing arm of a twist-beam axle, consists in providing a sheet metal support structure which is welded onto the suspension arm and to which the wheel axle is fixed, usually by means of screws. The shock-absorber associated to that wheel is connected to the suspension arm independently of the support structure, usually by means of brackets or threaded spacers. Such a known solution thus requires both a welding operation and a screw-fixing operation. The manufacturing of the suspension is therefore time consuming and expensive.

It is therefore an object of the present invention to provide a rear suspension for a motor vehicle which can be manufactured in a shorter time and at a lower cost than the prior art. A further object of the invention is to provide a rear suspension for a motor vehicle which can be easily adapted to different models of motor vehicles.

These and other objects are achieved, according to the present invention, by virtue of a rear suspension for a motor vehicle having the features defined herein.

According to a preferred embodiment of the invention, the suspension comprises, for each rear wheel, a trailing arm, a wheel-carrying structure fixed to that arm and an axle fixed to the wheel-carrying structure and defining the axis of rotation of the wheel, wherein the wheel-carrying structure is made as a single piece integrally forming an upper support portion having a cylindrical seat into which a transversely inner portion of the wheel axle is inserted and fixed, and a lower attachment portion including a pair of vertical flat walls which are parallel to each other, are arranged astride of a length of the trailing arm and have a plurality of through holes aligned in pairs; wherein the length of the suspension arm onto which the wheel-carrying structure is fixed forms a pair of facing vertical flat walls to which a corresponding plurality of spacing members are fixed, these members having respective axial through holes which are aligned with the holes of the wheel-carrying structure and project beyond the vertical walls of the aforesaid arm length so as to define with their opposite ends abutment surfaces for the vertical flat walls of the wheel-carrying structure; and wherein the wheel-carrying structure is fixed to the aforesaid length of the suspension arm by means of a corresponding plurality of fixing screws inserted into the through holes of the vertical flat walls of the wheel-carrying structure and of the spacing members.

By virtue of the use of a wheel-carrying structure according to the invention, the welding operations required for manufacturing the suspension become easier, since there is a smaller number of components to be welded and therefore of welding beads to be made. Moreover, the time for assembling the suspension is reduced, since less screw-fixing operations have to be carried out than in the prior art. Finally, by virtue of the use of spacing members which provide the reference and abutment surfaces for the vertical flat walls of the wheel-carrying structure, a precise shape mating between the wheel-carrying structure and the arm length onto which the structure is to be mounted is no more required. Accordingly, the same wheel-carrying structure can be mounted onto arms of different shapes and sizes, which allows a further reduction in the manufacturing costs of the suspension.

BRIEF DESCRIPTION OF THE DRAWINGS

Further features and advantages of the present invention will become evident from the following detailed description, given purely by way of non-limiting example with reference to the appended drawings, in which.

DETAILED DESCRIPTION OF THE INVENTION

In the description and the claims which follow, terms such as "longitudinal" and "transverse", "inner" and "outer", "front" and "rear", "horizontal" and "vertical" are to be intended as referred to the mounted condition on the vehicle.

Figure 1:
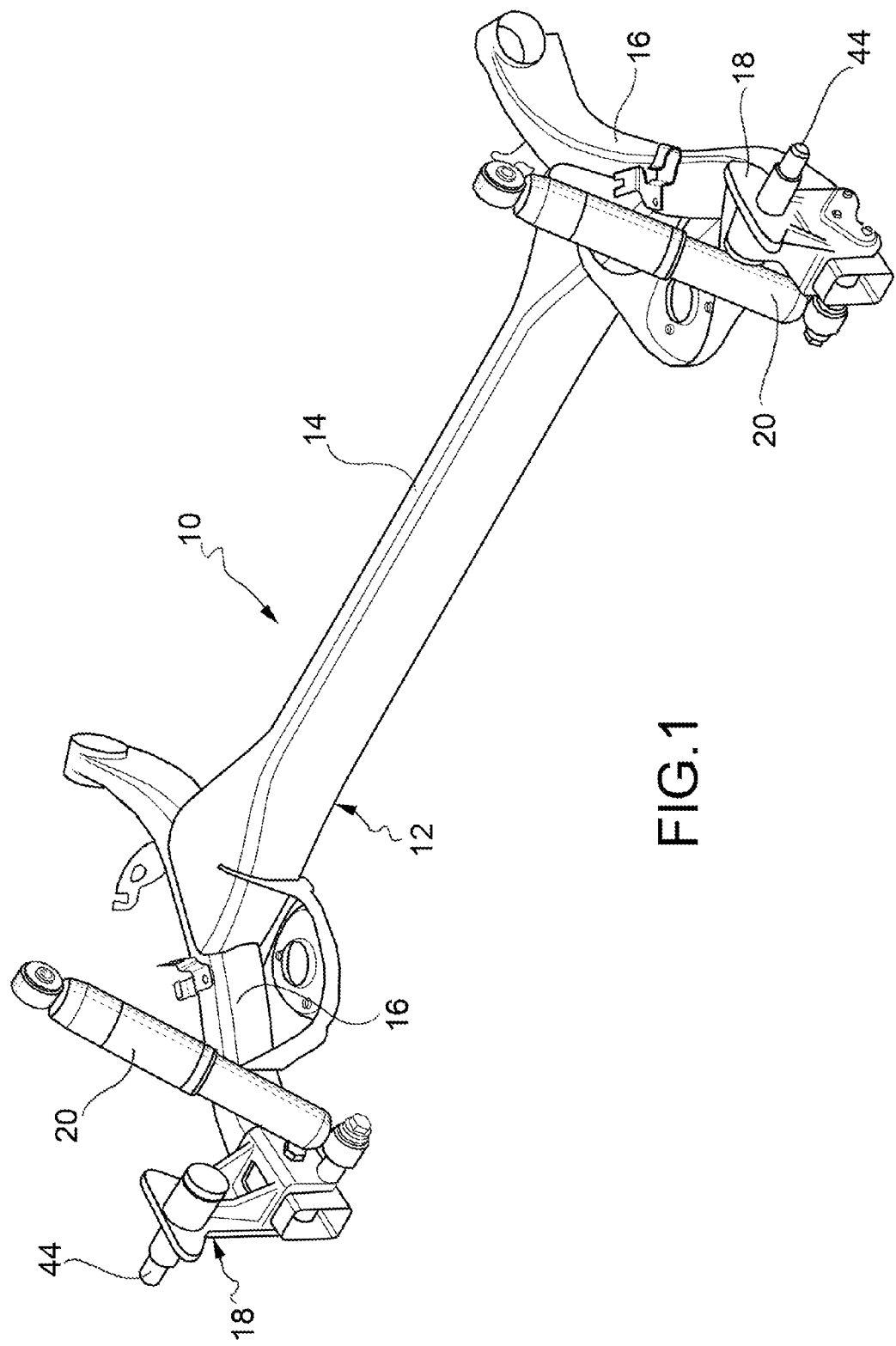
FIG. 1 is a perspective view generally showing an interconnected rear suspension for a motor vehicle according to a preferred embodiment of the present invention.

With reference first to FIG. 1, a rear suspension for a motor vehicle according to the invention, which is made in this case as an interconnected suspension, is generally indicated 10. However, the present invention is not to be considered as limited to this type of suspension, since it can be applied to an independent suspension as well.

The rear suspension 10 comprises a twist-beam axle 12, which includes in per-se-known manner a cross member 14 and a pair of trailing arms 16, to each of which a wheel-carrying structure 18 is fixed for support of a respective rear wheel (not illustrated). A pair of shock-absorbers 20 and a pair of springs (not illustrated), of per-se-known type, are interposed between the twist-beam axle 12 and the vehicle structure (not illustrated).

Figure 2:
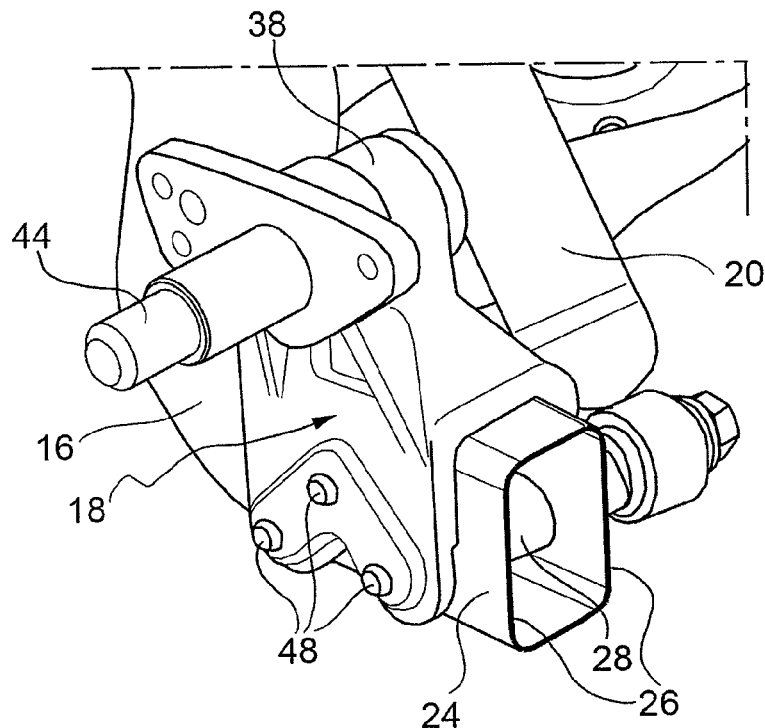
FIGS. 2 and 3 are perspective views showing in detail a portion of the suspension of FIG. 1 for connection to the left-hand rear wheel.
Figure 3:
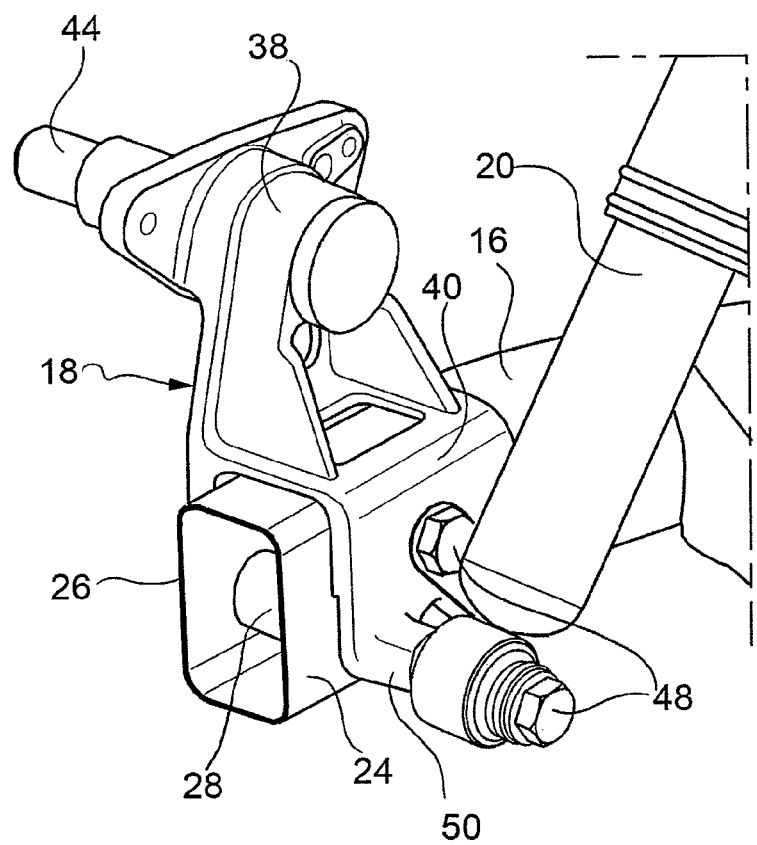

With reference in particular to FIGS. 2 and 3, the wheel-carrying structure 18 intended for support of the left-hand rear wheel will now be described in detail, it being clear that the other wheel-carrying structure is to be regarded as identical to the one described.

Figure 5:
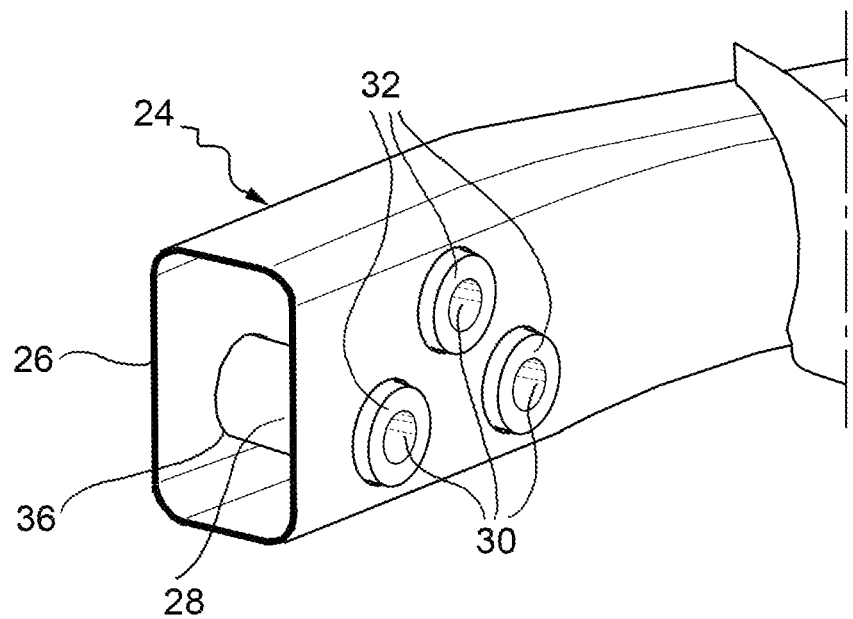
FIG. 5 is a perspective view showing in detail a length of a trailing arm of the suspension of FIG. 1 arranged for the fixing of the wheel-carrying structure of FIG. 4 thereonto.

The wheel-carrying structure 18 is fixed to a substantially straight, rear end length 24 of the trailing aim 16, which extends essentially longitudinally. The arm length 24 has a hollow cross-section of substantially rectangular shape, with a pair of vertical flat walls 26, that is an inner wall and an outer wall, respectively, parallel to each other. A plurality of spacers 28 (FIG. 5), in this case three non-aligned spacers, are interposed between the flat walls 26 and are made for example as cylindrical elements, each having a respective axial through hole 30. The spacers 28 extend perpendicularly to the vertical flat walls 26 of the arm length 24 and slightly project therefrom both on the transversely inner side and on the transversely outer side. The spacers 28 have end flat surfaces 32 suitably shaped so as to define, both on the transversely inner side and on the transversely outer side of the arm 16, a pair of abutment flat surfaces for respective vertical flat walls 34, parallel to each other, of the wheel-carrying structure 18. These two abutment flat surfaces thus define the spatial orientation of the wheel-carrying structure 18, and hence of the axis of rotation of the wheel, with respect to the arm 16, that is to say, they define the characteristic angles (toe angle and camber angle) of the suspension. The spacers 28 are inserted into respective through holes 36 (one of which can be seen in FIG. 5) provided in the vertical flat walls 26 of the arm length 24 and are secured therein by welding.

Figure 4:
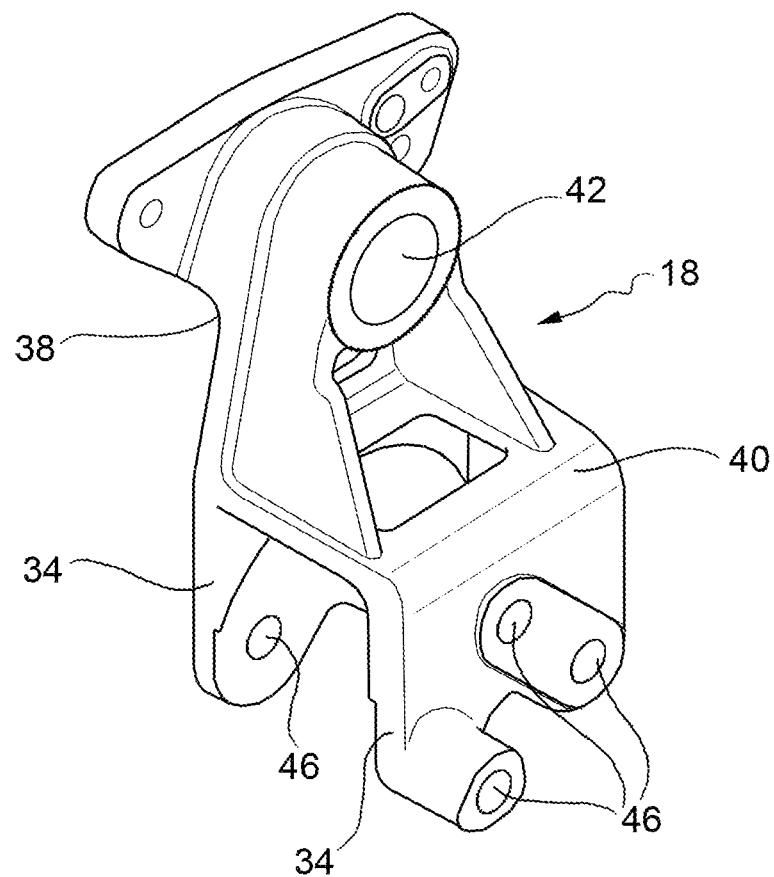
FIG. 4 is a perspective view of a wheel-carrying structure of the suspension of FIG. 1.

The wheel-carrying structure 18 is made as a single piece, preferably of cast iron, integrally forming an upper support portion 38 and a lower attachment portion 40. The upper support portion 38 has a cylindrical seat 42 (FIG. 4) into which a transversely inner portion of a steel wheel-carrying axle 44 is inserted and fixed. The lower attachment portion 40 has a substantially inverted U-shape and comprises the aforesaid pair of vertical flat walls 34, which are arranged astride of the arm length 24 and have three pairs of through holes 46 aligned two by two with each other, as well as aligned with the through holes 30 of the spacers 28. The wheel-carrying structure 18 is fixed to the arm length 24 by means of three screws 48 inserted into the holes 46 of the vertical flat walls 34 and into the holes 30 of the spacers 28. In the illustrated embodiment, the holes 34 made in the transversely outer flat wall 34 of the wheel-carrying structure 18 are threaded holes, whereby they engage the threaded shank of the screws 48. Alternatively, it is possible to provide for a fixing by means of screws and nuts.

Advantageously, the transversely inner, vertical flat wall 34 of the wheel-carrying structure 18 forms a cylindrical attachment portion 50 which extends transversely and in which one of the through holes 46 is provided. The attachment portion 50 serves for fixing the lower end of the rod of the shock-absorber 20. In this way, the same screw 48 serves both for fixing the wheel-carrying structure 18 to the arm 16 and for the fixing the rod of the damper 20. This enables to reduce the number of components of the suspension and to make the assembling easier and quicker.

Naturally, the principle of the invention remaining unchanged, the embodiments and the details of construction may be widely varied with respect to those described and illustrated purely by way of non-limiting example, without thereby departing from the scope of the invention as defined in the appended claims.

The invention claimed is:

1. Rear suspension (10) for a motor vehicle, comprising, for each rear wheel, a trailing arm (16), a wheel-carrying structure (18) fixed to a length (24) of the trailing arm (16) and an axle (44) fixed to the wheel-carrying structure (18) and defining the axis of rotation of the wheel, wherein the wheel-carrying structure (18) is made as a single piece integrally forming an upper support portion (38) having a seat (42) into which the wheel axle (44) is inserted and fixed, and a lower attachment portion (40) including a pair of vertical flat walls (34) which are parallel to each other, are arranged astride of said arm length (24) and have a plurality of through holes (46) in pairs;

wherein a corresponding plurality of spacing members (28), each having a through hole (30) and a pair of end flat surfaces (32), are fixed to said arm length (24), said spacing members (28) projecting beyond vertical walls (26) of the arm length (24) in such a manner that said end flat surfaces (32) form abutment flat surfaces for the vertical flat walls (34) of the wheel-carrying structure (18);

wherein the wheel-carrying structure (18) is fixed to the arm length (24) by means of a corresponding plurality of fixing screws (48) inserted into the through holes (46, 30) of the vertical flat walls (34) of the wheel-carrying structure (18) and of the spacing members (28), respectively, and wherein the rear suspension further comprises, for each rear wheel, a shock-absorber (20), wherein the transversely inner, vertical flat wall (34) of the wheel-carrying structure (18) forms a cylindrical projection (50) for connection to a lower end of the shock-absorber (20), said projection (50) extending transversely and having an axial through hole (46) through which one of the fixing screws (48) passes, whereby said screw (48) serves both for fixing the wheel-carrying structure (18) onto the arm (16) and for connection of the lower end of the shock-absorber (20).

2. Suspension according to claim 1, comprising three spacing members (28) each of which is made as a cylindrical element extending perpendicularly to the vertical flat walls (26) of the arm length (24).

3. Suspension according to claim 1, wherein the spacing members (28) are inserted into respective through holes (36) provided in the vertical flat walls (26) of the arm length (24) and are fixed to those walls by welding.

4. Suspension according to claim 1, wherein the wheel-carrying structure (18) is made of cast iron.

* * * * *